April 29, 1952 R. E. HERSEY ET AL 2,594,923

CALL DATA RECORDING TELEPHONE SYSTEM

Filed June 16, 1948 7 Sheets-Sheet 1

INVENTORS R. E. HERSEY
E. VROOM

BY [signature]

ATTORNEY

April 29, 1952 R. E. HERSEY ET AL 2,594,923

CALL DATA RECORDING TELEPHONE SYSTEM

Filed June 16, 1948 7 Sheets-Sheet 2

INVENTORS R. E. HERSEY
E. VROOM

BY

ATTORNEY

INVENTORS R. E. HERSEY
E. VROOM
BY [signature]
ATTORNEY

April 29, 1952 R. E. HERSEY ET AL 2,594,923

CALL DATA RECORDING TELEPHONE SYSTEM

Filed June 16, 1948 7 Sheets-Sheet 4

INVENTORS R. E. HERSEY
E. VROOM

BY [signature]
ATTORNEY

April 29, 1952 R. E. HERSEY ET AL 2,594,923

CALL DATA RECORDING TELEPHONE SYSTEM

Filed June 16, 1948 7 Sheets-Sheet 5

INVENTORS R. E. HERSEY
E. VROOM
BY [signature]
ATTORNEY

INVENTORS R. E. HERSEY
E. VROOM
BY [signature]
ATTORNEY

CALL DATA RECORDING TELEPHONE SYSTEM

Filed June 16, 1948 7 Sheets-Sheet 7

INVENTORS R.E. HERSEY
E. VROOM
BY
ATTORNEY

Patented Apr. 29, 1952

2,594,923

UNITED STATES PATENT OFFICE 2,594,923

CALL DATA RECORDING TELEPHONE SYSTEM

Ralph E. Hersey, Madison, N. J., and Edward Vroom, Ossining, N. Y., assignors to Bell Telephone Laboratories, Incorporated, New York, N. Y., a corporation of New York Application June 16, 1948, Serial No. 33,414

12 Claims. (Cl. 179—7.1)

This invention relates to call data recording telephone systems and more particularly to systems in which telephone call data are recorded during and subsequent to the establishment of connections.

In systems of this kind, the essential data to be recorded for each call is the full designation of the station called, which is necessary to determine the destination of the call; the number of the calling station, which is necessary to determine the subscriber to be charged for the call; and the times at which the talking connection is completed and terminated, from which may be determined the overtime charges, if applicable. The designation of the called station can be conveniently obtained for recording only at the beginning of the establishment of the connection. The times of completion and termination of the connection are, of course, determined later and are separated by a considerable time interval.

The present invention pertains to a recording system in which the data relating to a call is recorded in three separate associable entries on a continuous recording medium. The recording equipment is engaged on a particular call only during the times required to make each of these entries and is otherwise free to record, on the same medium, similar entries for other calls.

A feature of the invention is a common inductive-impulse equipment for signaling to the recorder the data to be recorded.

Another feature of the invention is a means whereby both the designation of the called station and the number of the calling station are obtained by the inductive-impulse equipment.

Still another feature of the invention is a means controlled by the inductive-impulse equipment for selecting the data to be recorded in each entry.

Still another feature of the invention is a signaling arrangement comprising an inductive distributor adapted to produce time-spaced impulses, and a synchronously operated inductive impulser which, in response to the setting of registering apparatus in accordance with the designation of the called station or other item of record information, operates to produce other time-spaced impulses coincident with certain of the impulses produced by the distributor, to effect with said latter impulses the selective operation of electronic networks or other responsive equipment, thereby to indicate the item of information registered in said registering apparatus.

These and other features of the invention will be more apparent from the following specification, the appended claims, and the drawings, in which:

Figure 7:
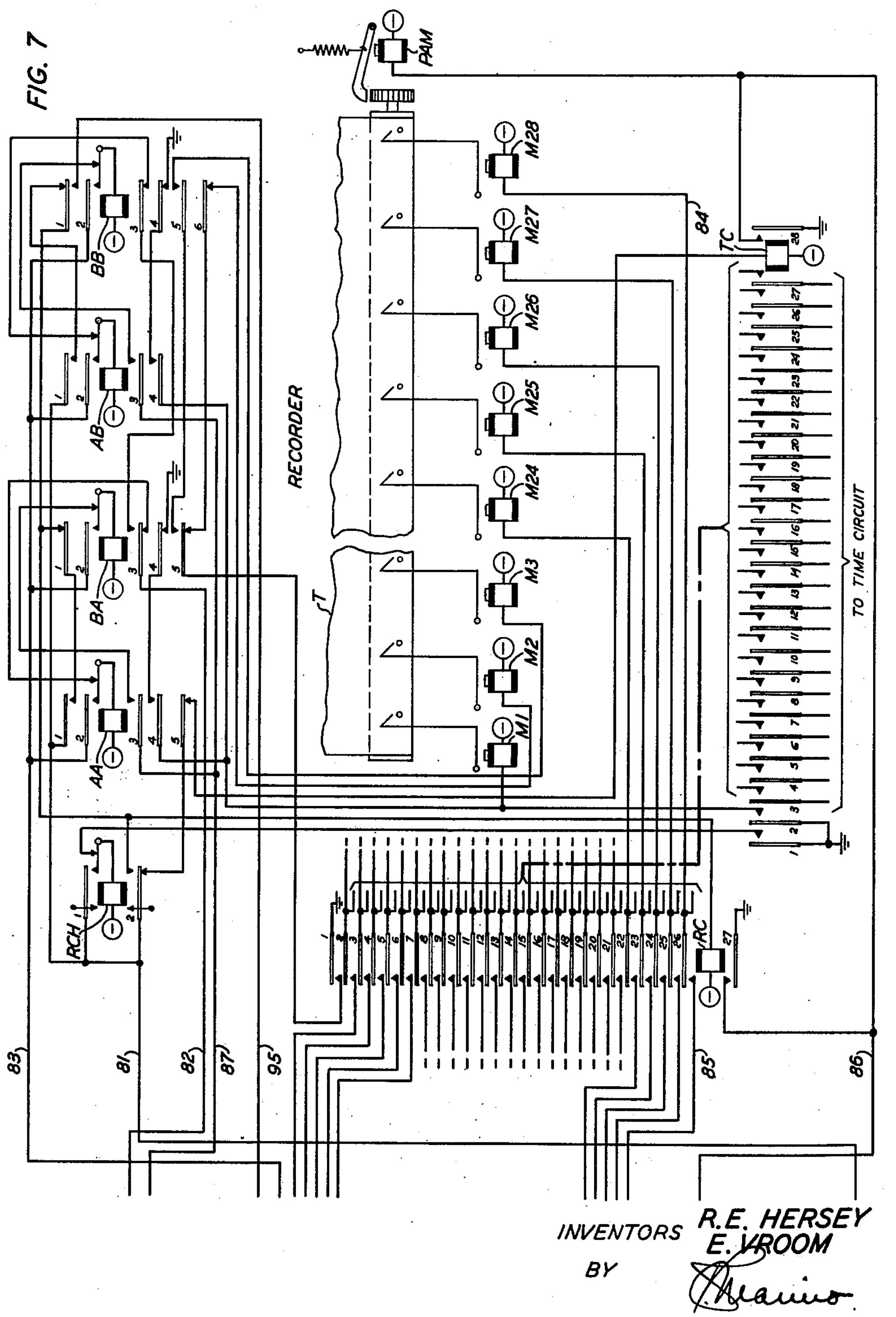
Fig. 7 shows the recorder and associated circuits.

The invention is illustrated in its application to a telephone system in which senders are employed to control the connecting switches to establish connections and in which the call data is recorded by a recorder of the perforating type, such as is disclosed, for example, in the copending application of W. W. Carpenter, Serial No. 588,401, filed April 14, 1945, now Patent No. 2,583,086, granted January 22, 1952, to which reference may be had for a more complete description of the construction and operation of the recorder herein utilized as part of the invention and shown diagrammatically in Fig. 7. The data to be recorded is represented by digits and, in the recorder, these digits are recorded by successive lines of perforations across a wide paper tape, each digit being represented by the relative positions of two holes made by the operation of a combination of two of a group of five punches. In systems of this kind, it is convenient to designate arbitrarily the five punches or other elements of a group (0), (1), (2), (4) and (7), respectively, and to select these elements, in combination, to represent digits as follows:

| Digit | Elements in Combination |
|---|---|
| 1 | (0) (1) |
| 2 | (0) (2) |
| 3 | (1) (2) |
| 4 | (0) (4) |
| 5 | (1) (4) |
| 6 | (2) (4) |
| 7 | (0) (7) |
| 8 | (1) (7) |
| 9 | (2) (7) |
| 0 | (4) (7) |

This notation is used in the present illustration.

In the present embodiment of the invention, when a call is originated, the designation of the called station is first recorded. This is assumed, in the present example, to consist of eight digits.

The recorder employed, however, has a capacity for recording five digits in one line. While it is no doubt possible to make recorders of this type to record more digits in one line, such recorders are complicated and inconvenient. Arrangements have been made in the present invention, therefore, to record the eight digits of the called-station designation in two lines, the last five digits in the first line and the first three digits in the second line. The arrangement of the recorder circuits requires that five digits be recorded in every line, so the unused capacity in the second line is filled by recording two zeros.

The number of the calling station is next recorded in the third line. It is assumed that this number has a maximum of five digits, which is generally the case, and can, therefore, be recorded on one line. The items thus recorded on three lines of the recording medium constitute one entry relating to the call. An additional single hole is punched in each line, the relative positions of these holes indicating the association of the lines and the character of the entry. After this entry is made, the recorder is released and may be used to record data relating to other calls.

When the called party answers a connection, a record is made, on one line of the recording medium, of the number of the calling station and, on the next line, a record of the current time. These two lines constitute a second entry relating to the call and are each distinguished by a suitably-placed single hole. The recorder is again freed and may be used for records of other calls. When the connection is terminated, another entry, similar to the preceding, is made. The three entries comprise the record of the call and may be associated by the calling-station number recorded in each.

Figure 6:
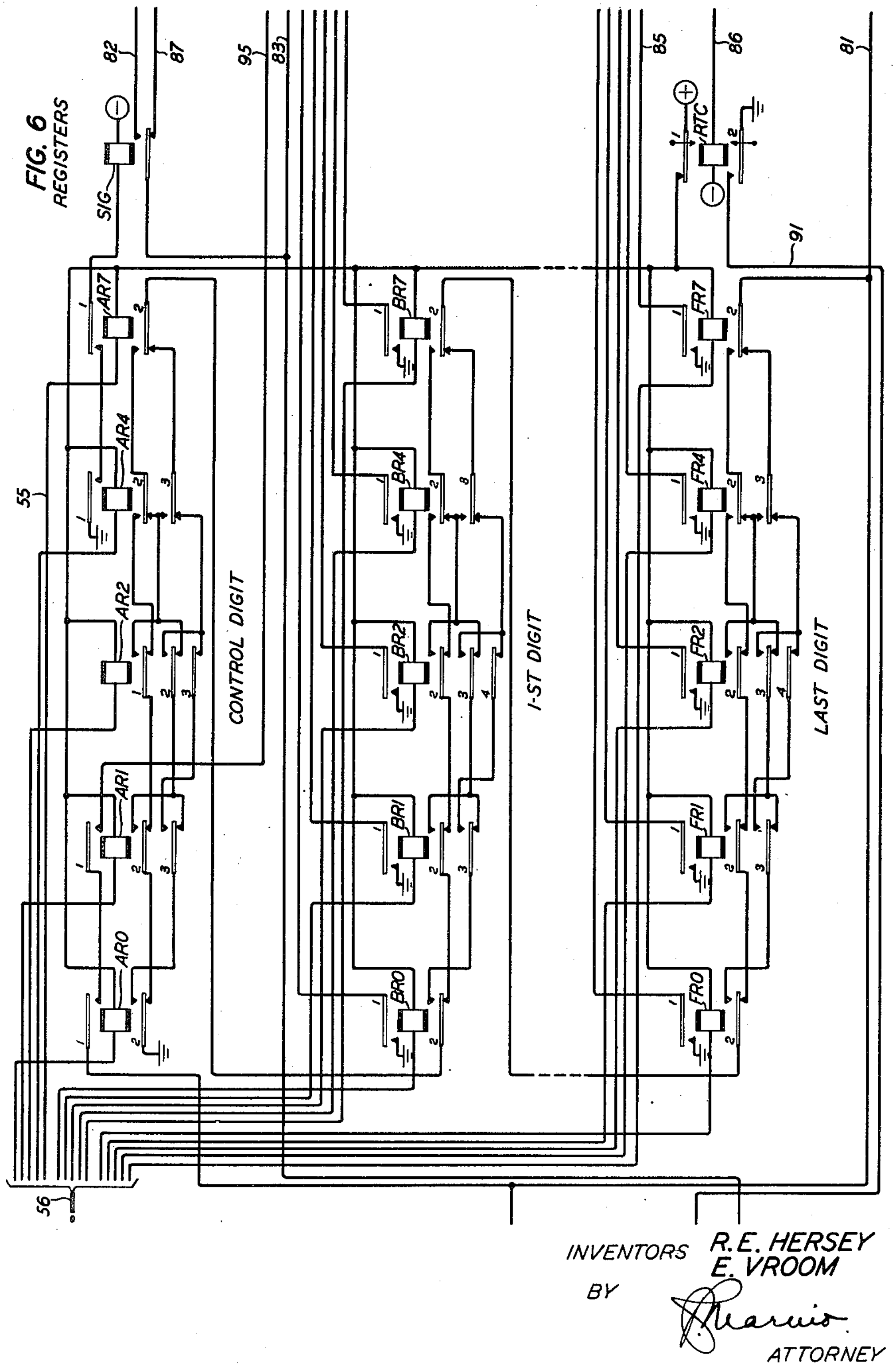
Fig. 6 shows register circuits.

The digits to be recorded are registered by relays, some of which are shown in Fig. 6. Sufficient register relays are provided for registering at one time the number of digits which can be recorded on one line of the record, and an additional set is provided for registering an additional digit for control purposes. Relays AR0 . . . AR7 are the relays for registering this latter or "control" digit, relays BR0 . . . BR7 are the relays for registering the first digit of a line, and relays FR0 . . . FR7 are the relays for registering the last digit of a line, intervening groups of relays for registering the intermediate digits not being shown. These registrations are made by operating the relays in combinations in accordance with the code given above and the relays actuate corresponding combinations of punch magnets in the recorder. To operate the register relays in accordance with the designation of the called station, an inductive impulser SP, one of which is associated with each sender, is used in conjunction with a somewhat similar common inductive distributor RD. These each comprise a series of circumferentially-arranged equally-spaced coils 74 or 75, respectively, and a rotating coil or magnet *c* or *m*, respectively. The part *m* of the distributor RD may be a constantly-energized magnetic coil or it may be a permanent magnet. The coils *c* and *m* are continuously rotated in synchronism so that they pass corresponding circumferential coils at the same time. The circumferential coils correspond to the register relays, including those of the control digit.

Figures 1, 8:
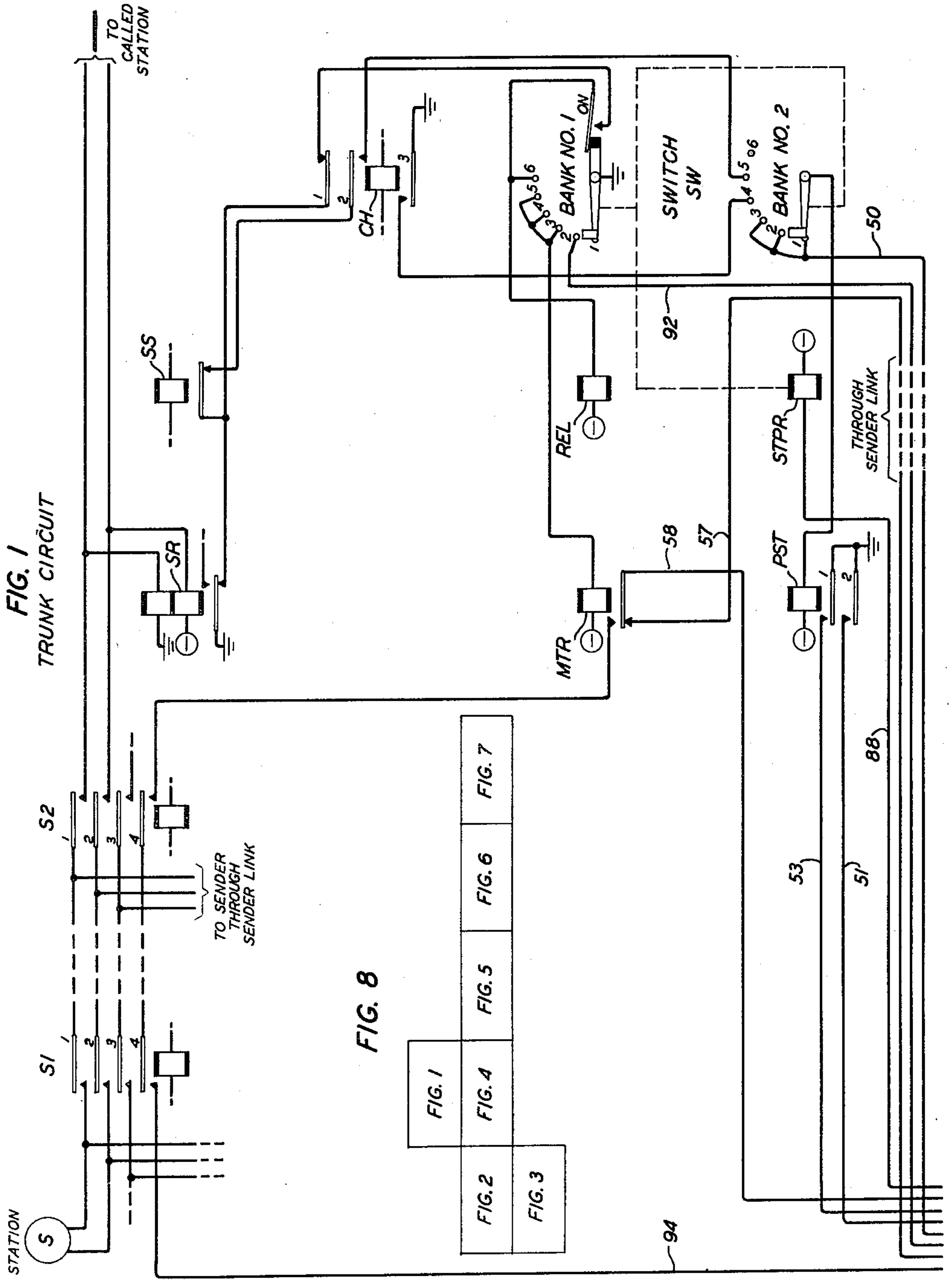
Fig. 1 shows a subscriber's line, connecting switches, and a trunk circuit.
Fig. 8 shows how the above figures should be placed in relation to one another to disclose the invention completely.
Figure 2:
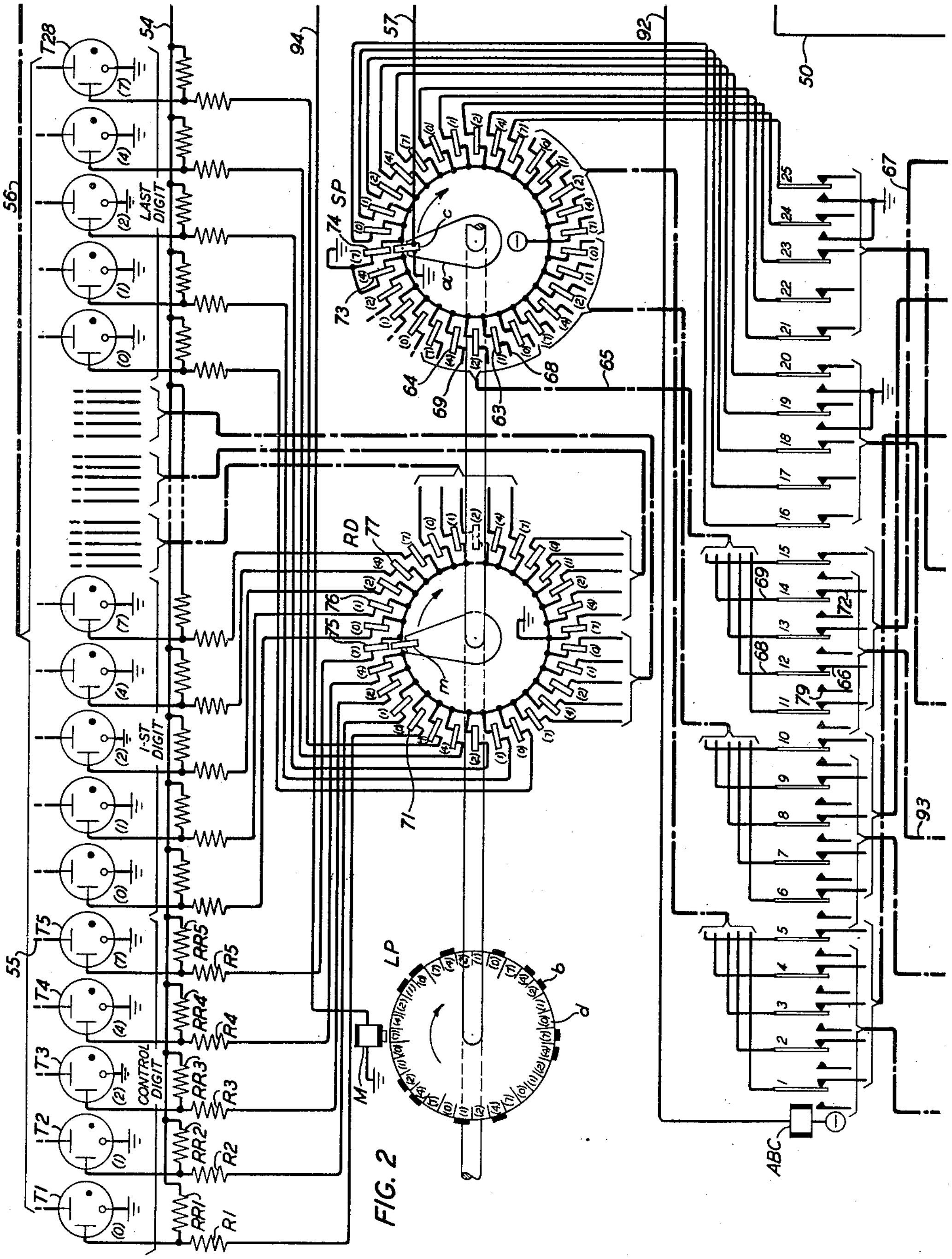
Fig. 2 shows the impulse devices and associated circuits.

For operating the register relays to register the number of the calling station, an inductive device is provided for each station, LP in Fig. 2 being the device associated with station S of Fig. 1. This device comprises a disc *d* of non-magnetic material having circumferential projections or inserts *b* of magnetic material, arranged to pass, when the disc is rotated, close to the pole of the electromagnet M, the core of which is permanently magnetized. The disc *d* is rotated in synchronism with the coil or magnet *m* of distributor RD and, of course, the coil C of the inductive impulser SP, and the projections or inserts *b* are disposed around disc *d* in angular correspondence with the circumferential coils of distributor RD, which insert *b*, taken in combinations in accordance with the code given above, represent the digits of the number of the station with which disc *d* is associated. For example, if the first digit of the station number is "5," and remembering that the code digit is 1, 4, then a projection or insert *b* is placed on disc *d* so that it passes the pole of magnet M when the coil or magnet *m* of distributor RD passes coil 76 thereof and another projection or insert *b* is placed so that it passes the pole of magnet M when the coil or magnet *m* passes coil 77. That is, the projections or inserts *b* are in angular correspondence with the second and fourth coils of the first group of five coils on distributor RD which are associated, respectively, with the second and fourth register relays (BR1 and BR4) of the group for registering the first digit of a line on the recorder in the two-out-of-five code given above.

Projections or inserts for other digits to be recorded are placed in a similar manner. The two projections for the sixth or last digit, used for control purposes, and registered by relays AR0 . . . AR7, are placed to represent the digit "1." A similar disc with suitably-placed projections or inserts and a magnet M is provided for each station and all these discs are continuously rotated in synchronism with each other, with impulser SP, and with distributor RD, either by mounting them all on the same shaft as shown or by any other suitable means. The register relays are not operated directly by these impulsing devices but through the medium of the gas-filled triode tubes T1 . . . T28.

The mode of operation of the invention as well as other details of its present embodiment will be more clearly understood from the description, which follows, of recording operations in connection with a particular call.

Figure 3:
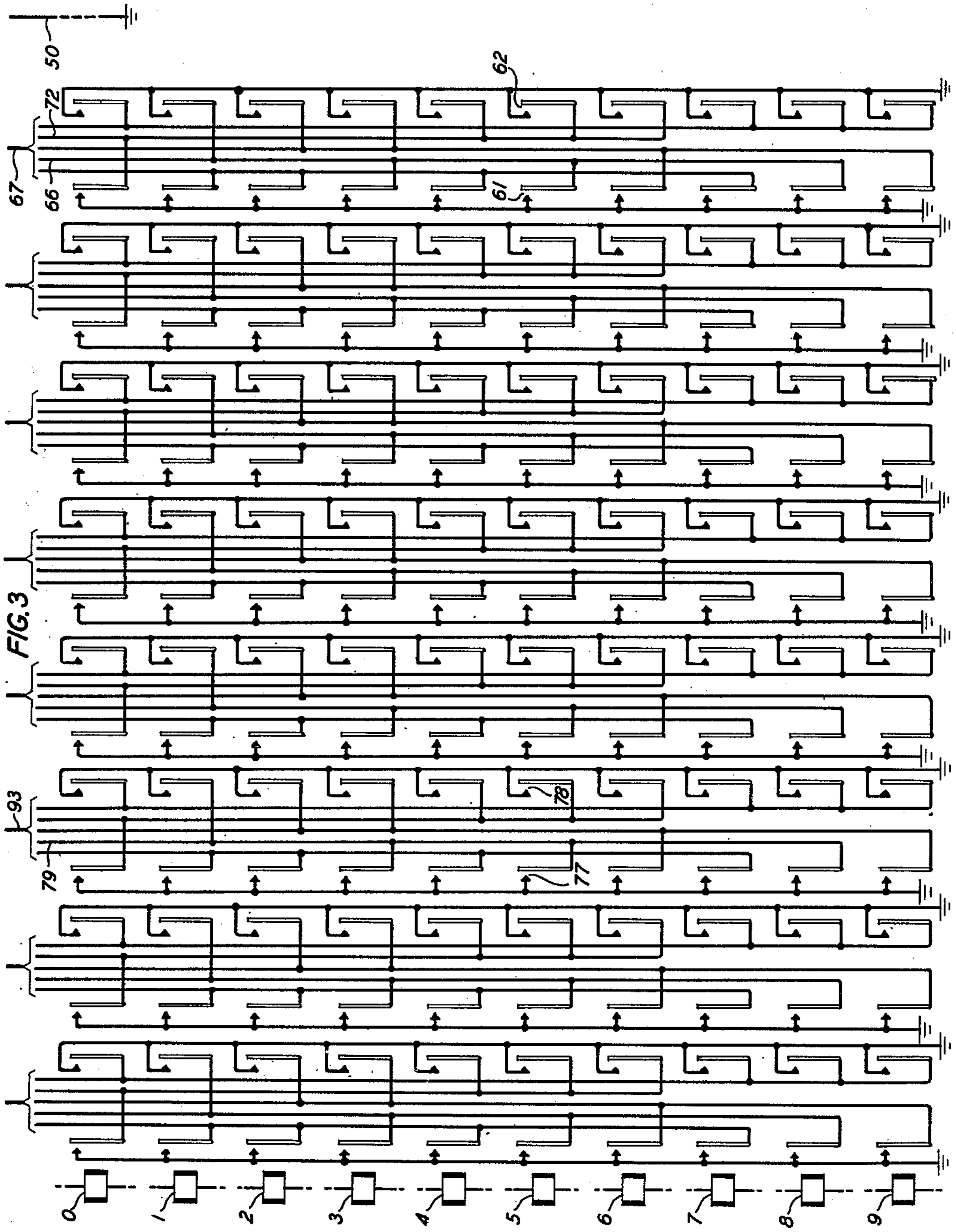
Fig. 3 shows the register switch of a sender.
Figure 4:
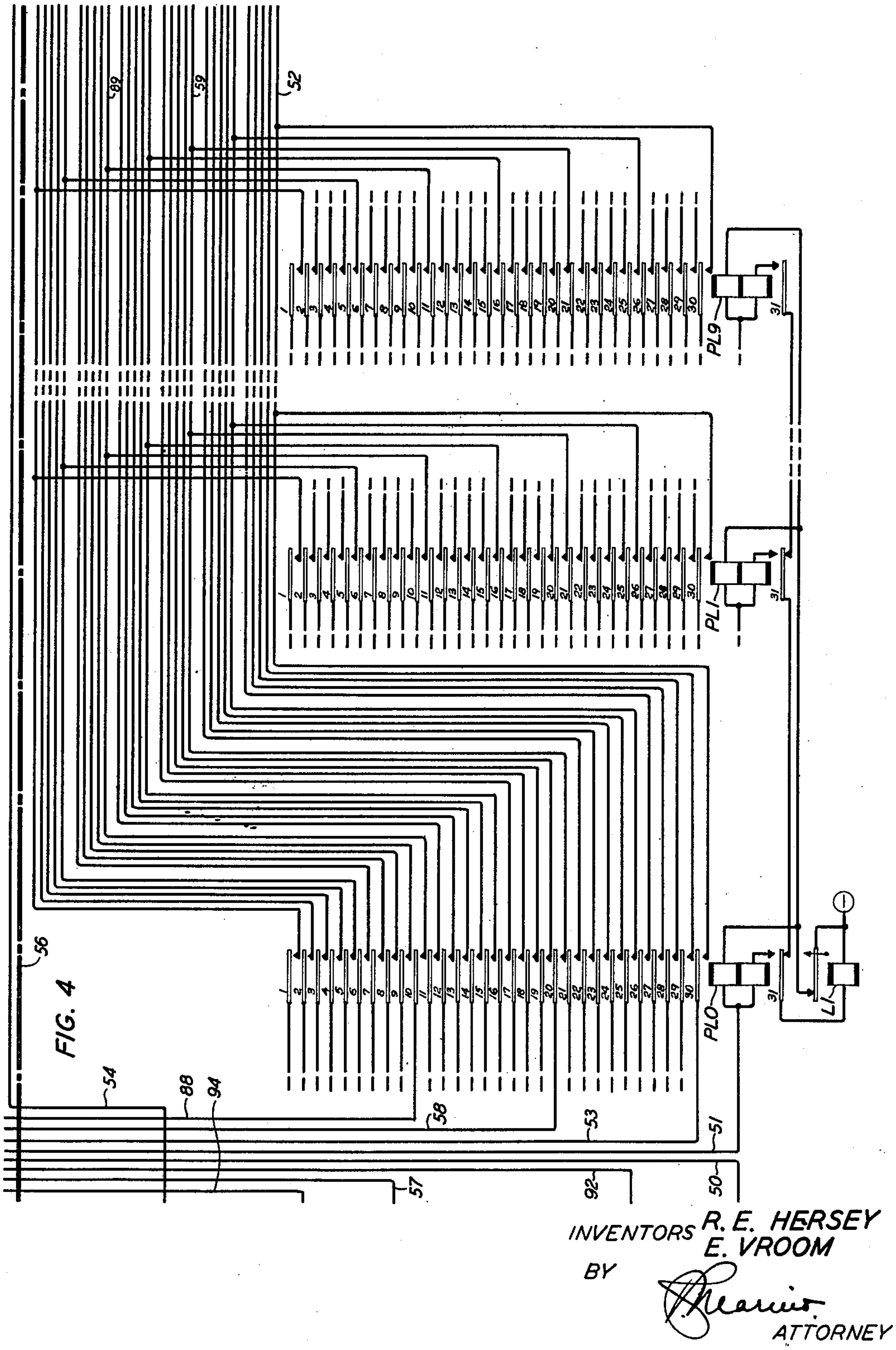
Figs. 4 and 5 show the connector circuit.
Figure 5:
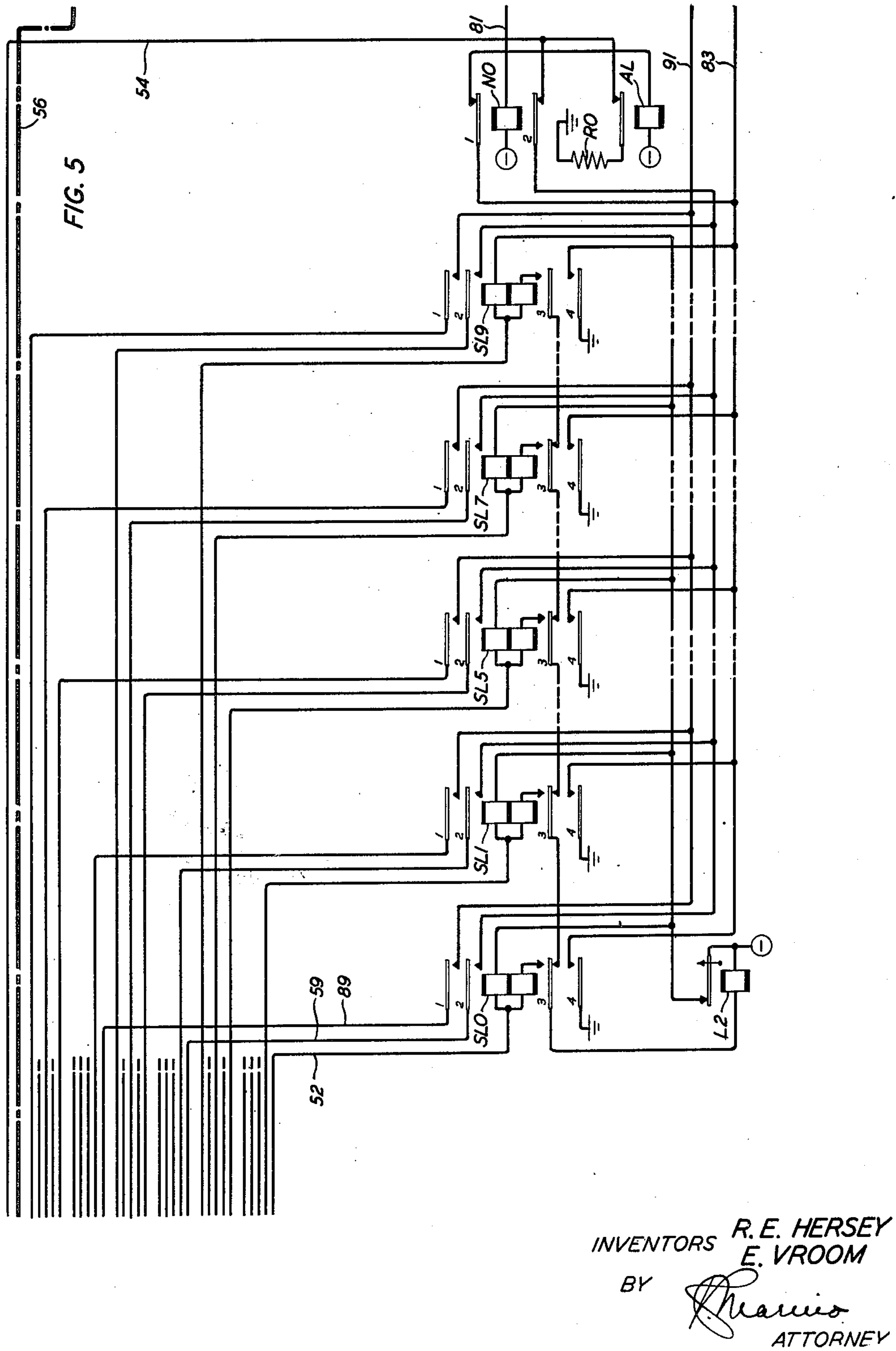

When a call is originated at station S, the line of said station is extended by the line-link switches S1 and S2 in the usual manner to a trunk circuit, such as is partly disclosed in Fig. 1, and further extended by a sender link to a sender. The designation of the called station dialed at station S is then registered in a register switch in the sender. The equipment for performing these operations and its method of operation is so well known that it is not thought necessary to disclose it completely here nor to describe its operation in detail. Reference may be had to the patent to W. W. Carpenter, No. 2,235,803 issued March 18, 1941 for a description of the construction and operation of one type of equipment to which the present invention is applicable. Fig. 3 represents the sender register switch of the well-known cross bar type. Each of the digits dialed at station S is registered by the closure of the contacts on one vertical of said switch at the level corresponding to the particular digit dialed.

The above operations having been completed, when it is desired to record the data relating to the call being made, conductor 50 is grounded in any suitable manner, for example, by a relay in the sender. Relay PST then operates over a circuit extending from battery through the winding of said relay and the arm and No. 1 terminal of switch SW in the trunk to which the line of station S is extended, to said ground on conductor 50. A circuit is thereby completed from battery through the contacts of relay L1, upper winding of relay PL0, conductor 51, and No. 2 contacts of relay PST to ground, over which relay PL0, associated with the trunk to which the line of station S is extended, operates. Said relay PL0 locks up over a circuit extending from battery through the winding of relay L1, which is thereby operated, and No. 31 front contacts and lower winding of relay PL0, to the above-traced ground on conductor 51. The contacts of relay L1 open the operating circuits of and prevent the operation of any of the relays PL1 . . . PL9 associated, respectively, with other trunk circuits. Relay SL0, associated with the trunk to which station S has been connected then operates if none of the relays SL1 . . . SL9 are operated, over a circuit extending from battery through the contacts of relay L2, upper winding of relay SL0, conductor 52, No. 30 contacts of relay PL0, conductor 53, and No. 1 contacts of relay PST to ground, and locks up over a circuit extending from battery through the winding of relay L2, which is thereby operated, No. 3 front contacts of relay SL0, and lower winding of said latter relay to said ground on conductor 52. If one of relays SL1 . . . SL9 is operated, relay SL0 awaits release of the operated relay. The contacts of relay L2 open the operating circuits of and prevent the operation of any of the relays SL1 . . . SL9. When relay SL0 operates, relay AL operates over a circuit extending from battery through the winding of said relay, No. 1 contacts of relay N0, and No. 4 contacts of relay SL0 to ground. The contacts of relay AL disconnect resistor R0 from conductor 54 but the coil C of impulser SP, of substantially the same impedance is now connected thereto over conductor 57, back contacts of relay MTR, conductor 58, No. 20 contacts of relay PL0, conductor 59, No. 2 contacts of relay SL0, and No. 2 contacts of relay N0 to conductor 54.

When the sender register switch of Fig. 3 operated to register the designation of the called station, some of the circumferential coils of the impulser SP were thereby energized. For example, if the last digit dialed was "5," it was registered by the closure of contacts 61 and 62 of said register switch. Coils 63 and 64 of impulser SP are thereby energized, coil 63 over a circuit extending from battery through the winding of said coil, conductor 68 within bracket 65, No. 12 back contacts of relay ABC, conductor 66 within bracket 67, and contacts 61 to ground. As the magnet $m$ of distributor RD, in revolving, passes each of the circumferential coils of the distributor, it induces therein a wave of current, the path of which extends from ground through the coil, for example, coil 71, thence through resistor R1, resistor RR1, and by a number of parallel paths to ground. One of these latter paths may be traced, when relay AL is not operated, through the contacts of said relay and resistor R0 to ground. Each of the other parallel paths comprises one of the resistors RR2, RR3, etc., one of the resistors R2, R3, etc., and one of the coils of distributor RD. All of the resistors R1, RR1, R2, RR2, etc., have the same value which is high compared to the resistance of each of the coils of distributor RD or resistor R0. The combined resistance of the parallel paths is, therefore, low compared to the value of resistor R1 or resistor RR1. The potential at the junction of resistors R1 and RR1 and at the starting electrode of tube T1 is consequently not more than half the potential induced in coil 71 of distributor RD by the passage of magnet $m$ when relay AL is not operated. The same condition exists when relay AL is operated, for then resistor R0 is replaced by coil $c$ of impulser SP which, as previously stated, has substantially the same impedance as resistor R0. Obviously the same conditions hold for each of the other tubes T2 . . . T28 in succession as magnet $m$ revolves. The anode of each of the tubes T1 . . . T28 is supplied, through the winding of the corresponding register relay, with potential suitable for maintaining but not for initiating conduction. Tube T5 is supplied, for example, by positive battery through the No. 1 contacts of relay RTC, the winding of relay AR7, and conductor 55 within bracket 56 to the anode of said tube. The values of the elements are so chosen that the potential at the starting electrode of each of said tubes, under the conditions described above, is insufficient to fire the tube. However, after the operation of relay AL, when coil $c$ of impulser SP passes an energized circumferential coil of said impulser, for example coil 74, a potential is induced in coil $c$ substantially equal to the potential induced at the same time by magnet $m$ in the corresponding circumferential coil of distributor RD. The potential from coil $c$ is transmitted over conductor 57, back contacts of relay MTR, conductor 58, No. 20 contacts of relay PL0, conductor 59, No. 2 contacts of relay SL0, No. 2 contacts of relay N0, conductor 54, and through parallel paths, each comprising one of the resistors R1, R2, etc., one of the resistors RR1, RR2, etc., and one of the circumferential coils of distributor RD, to ground. The potential thereby produced at the starting electrodes of the tubes T1 . . . T4 and T6 . . . T28 is not more than half the potential induced in coil $c$ and is insufficient to fire any of said tubes. The starting electrode of tube T5 is also supplied, however, with potential from coil 75 through resistor R5. The potential at said starting electrode is, therefore, substantially equal to the potential induced in coil $c$ or in coil 74 and is sufficient to fire said tube. Other tubes corresponding to energized circumferential coils of impulser SP are similarly fired. Each fired tube draws current through its anode, operating the corresponding register relay through the winding of which said current is supplied. Since as has been shown, the energized circumferential coils of impulser SP correspond to digits registered by the sender register switch, a combination of register relays is operated that corresponds to said digits. Register relays AR4 and AR7 are also similarly operated in accordance with the energized coils 73 and 74, operating relay SIG over an obvious circuit. Ground is then extended from the No. 2 contacts of relay AR0, through contacts of the other register relays, to conductor 81, if two and only two register relays in each group of five are operated, which should, of course, be the case. Relay N0 then operates over an obvious circuit, its No. 2 contacts disconnecting coil $c$ of impulser SP from conductor 54 and its No. 1 contacts opening the circuit of and releasing relay AL which reconnects resistor R0 to conductor 54, thus restoring the normal condition of the impulsing circuits. Relay AA operates over a circuit extending from battery through the winding and No. 2 normal contacts of said relay, No. 3 back contacts of relay BA, conductor 82, front contacts of relay SIG, conductor 83, and No. 4 contacts of relay SL0 to ground and locks up through its No. 2 front contacts to the same ground on conductor 83. Relay RC then operates over a circuit extending from battery through the winding of said relay, No. 1 contacts of relay BA, and No. 1 contacts of relay AA to the above-mentioned ground on conductor 81. Contacts of the register relays are thereby connected to punch magnets of the recorder and a combination of said punch magnets is operated to punch a corresponding record on one line of the tape T of the recorder. For example, if register relay FR7 is one of the register relays operated, then punch magnet M28 operates over a circuit extending from battery through the winding of said magnet, conductor 84, No. 26 contacts of relay RC, conductor 85, and No. 1 contacts of relay FR7 to ground. The last five digits of the designation of the called line are thus recorded. Punch magnet M1 also operates over a circuit extending from battery through the winding of said magnet, No. 4 contacts of relay AA, and No. 4 contacts of relay BA to ground, punching a single hole whose position indicates that the line recorded is part of an entry of more than one line.

When relay RC operated, the paper-advance magnet PAM operated over an obvious circuit, actuating the paper-advance mechanism of the recorder but not advancing the tape T because said mechanism is arranged to advance said tape only upon the release of magnet PAM. Relay RTC also operates over a circuit extending from battery through the winding of said relay, conductor 86, and No. 27 contacts of relay RC to ground. The No. 1 contacts of relay RTC disconnects batttery from the windings of the register relays thereby releasing all operated register relays and punch magnets and extinguishing all of the tubes T1 . . . T28 which were fired. Relay RTC is slow to operate to give time for the punch magnets to operate. When relays AR4 and AR7 are thus released, relay SIG is thereby released and relay BA operates over a circuit extending from battery through the winding and No. 2 normal contacts of said relay, No. 3 contacts of relay AA, conductor 87, back contacts of relay SIG, conductor 83, and No. 4 contacts of relay SL0 to ground and locks up through its No. 2 front contacts to the same ground on conductor 83. The circuits of punch magnet M1 and relay RC are thereby opened and said magnet and said relay released. Release of relay RC releases the paper-advance magnet PAM, thereby advancing tape T to a position for recording a new line. Release of relay RC also releases relay RTC.

When relay RTC operated, as described above, a circuit was thereby completed from battery through the winding of the stepping magnet STPR of switch SW, conductor 88, No. 10 contacts of relay PL0, conductor 89, No. 1 contacts of relay SL0, conductor 91, and No. 2 contacts of relay RTC to ground, over which said stepping magnet operated and when relay RTC released, said stepping magnet released. This operation moved the arms of switch SW to the No. 2 terminals of said switch. Relay PST is not thereby released as the arm of bank No. 2 of switch SW bridges adjacent terminals. The release magnet REL of switch SW is not operated by the closure of the off-normal contacts ON of said switch since, unless the calling party has abandoned the call, the supervisory relay SR of the trunk is operated. If at any time, the calling party does abandon the call, releasing relay SR, the release magnet REL operates over a circuit extending from battery through the winding of said magnet, contacts ON, No. 1 contacts of relay CH, and back contacts of relay SR to ground, returning the arms of switch SW to the No. 1 terminals and the further recording operations hereinafter described are not performed in connection with the present call.

Assuming that the call is not abandoned, relay ABC operates over a circuit extending from battery through the winding of said relay, conductor 92, and No. 2 terminal and arm of bank No. 1 of switch SW to ground. Circumferential coils of impulser SP are thereby connected to the first three verticals of the sender register switch of Fig. 3 and combinations of said coils are energized in accordance with the digits of the designation of the called station registered on said verticals. For example, if the digit "5" is registered on the third vertical of said switch, contacts 77 and 78 are closed. Coil 63 is then energized over a circuit extending from battery through the winding of said coil, conductor 68 within bracket 65, No. 12 front contacts of relay ABC, conductor 79 within bracket 93, and contacts 77 to ground; coil 64 is energized over a similar circuit through contacts 78 to ground.

When relay BA operates as described above, the circuit of relay N0 is opened and said latter relay released. Relay AL then reoperates and the coil $c$ of impulser SP is again connected to conductor 54 by No. 2 contacts of relay N0. In a revolution of the coil $c$ of impulser SP, register relays are again operated in the manner previously described. The combination of register relays operated comprises relays AR4 and AR7, relays corresponding to the three digits registered on the first three verticals of the sender register switch, and two zeros, the latter corresponding to the Nos. 19, 20, 24 and 25 front contacts of relay ABC, which, it will be observed, are grounded. Operation of relays AR4 and AR7 causes the operation of relay SIG as before. Relay AB operates over a circuit extending from battery through the winding and No. 2 normal contacts of said relay, No. 3 contacts of relay BB, No. 3 front contacts of relay BA, conductor 82, front contacts of relay SIG, conductor 83, and No. 4 contacts of relay SL0 to ground, and locks up through its No. 2 front contacts to the same ground on conductor 83. Two relays of each group of register relays having operated, relay RC operates over a circuit extending from battery through the winding of said relay, No. 1 back contacts of relay BB, No. 1 contacts of relay BB, conductor 81, and the checking contacts of the register relays previously described, to ground at back contacts of relay AR0. Punch magnets corresponding to operated register relays are thereby operated in the manner described in connection with the recording of the first line. The first three digits of the designation of the called station together with two zeros are thus recorded. Punch magnet M1 again operates over a circuit extending from battery through the winding of said magnet, No. 4 contacts of relay AB, and No. 4 contacts of relay BB to ground, punching a single hole whose position indicates that the line recorded is a part of an entry of more than one line.

Relays N0 and RTC again operate, as previously described, restoring the register relays and releasing the punch magnets. Upon the release of relays AR4 and AR7, relay SIG releases and relay BB operates over a circuit extending from battery through the winding and No. 2 normal contacts of said relay, No. 3 contacts of relay AB, conductor 87, back contacts of relay SIG, conductor 83, and No. 4 contacts of relay SL0 to ground. Relay BB locks up through its No. 2 front contacts to the same ground on conductor 83. The circuit of relay RC is thereby opened and said relay released, releasing relay RTC. The operation and subsequent release of relay RC operates and releases the paper-advance magnet PAM which advances the tape T to a position for recording the next line.

When relay RTC operates and releases, as described above, the stepping magnet STPR of switch SW is thereby operated and released, over the circuit previously traced, stepping the arms of switch SW to the No. 3 terminals of said switch. Relay MTR then operates over an obvious circuit, disconnecting coil *c* of impulser SP from conductor 54 and connecting the winding of magnet M of impulser LP over conductor 94, No. 4 contacts of link S1, No. 4 contacts of link S2, front contacts of relay MTR, conductor 58, No. 20 contacts of relay PL0, conductor 59, No. 2 contacts of relay SL0, and No. 2 contacts of relay N0 to conductor 54. Magnet M now takes the place of coil *c* in the pulsing circuit previously described and acts in a similar manner. Each time a magnetic projection or insert on disc *d* passes the pole of magnet M, potential is induced in the winding of said magnet and a corresponding one of tubes T1 . . . T28 is fired, in the manner previously described, operating a corresponding register relay. Since, as previously explained, the magnetic projections or inserts of disc *d* are spaced in accordance with the five digits of the number of station S, register relays are operated in accordance with said digits. The magnetic projections or inserts for the sixth digit are spaced to correspond to the digit "1". Register relays AR0 and AR1 are thereby operated, operating RC over a circuit extending from battery through the winding of said relay, No. 1 front contacts of relay BB, conductor 95, No. 1 contacts of relay AR1 and AR0 in series, conductor 81 and the checking contacts of the register relays to ground at front contacts of relay AR0.

Punch magnet M3 operates over a circuit extending from battery through the winding of said magnet, No. 5 contacts of relay BB, No. 5 front contacts of relay BA, and No. 1 contacts of relay RC to ground, punching a hole whose position indicates that the line being recorded is the last line of an entry containing three lines. The recording of the remainder af this line and the advance of tape T is carried out in the same manner as already described for the previous lines.

The operation and release of the stepping magnet STPR in response to the operation and release of relay RTC moves the arms of switch SW to the No. 4 terminals of said switch. Relay MTR is still maintained operated but the circuit of relay PST is thereby opened and said latter relay released, releasing in turn, relays PL0, SL0, AA, BA, AB, and BB. The holding circuits of relays L1 and L2 are thereby opened and said relays release but they are slow to release to prevent operation of any of the relays PL0 . . . PL9 or SL0 . . . SL9 before all of the operated relays are released. The recording equipment is now in its normal condition and available for recording data relating to calls over other trunks associated with relays PL1 . . . PL9. Recording of data for another call is carried out in the same manner as described for the present call but the impulser associated with the other calling station is associated with the recorder instead of impulser LP.

When the called party answers the present connection, the called-supervisory relay SS of the trunk is operated and after a suitable interval, the charge relay CH of the trunk is operated in the well-known manner. Relay PST then operates over a circuit extending from battery through the winding of said relay, the arm and No. 4 terminal of bank No. 2 of switch SW, and No. 3 contacts of relay CH to ground, causing, in the manner already described, the operation of relays PL0 and SL0 to connect the recorder to the trunk. Relay AL then operates over the circuit previously traced and relay MTR being operated, a combination of register relays is operated by impulser LP in accordance with the number of station S, as described for the previous line recorded. When two register relays of each group of five have operated, including relays AR0 and AR1, relay TC operates over a circuit extending from battery through the winding of said relay, No. 5 contacts of relay AA, No. 2 back contacts of relay RCH, conductor 81, and the checking contacts of the register relays to ground at front contacts of relay AR0. Relay TC connects a time circuit of any suitable form, such circuits being well known, to the punch magnets of the recorder whereby said magnets are operated to record digits indicative of the current time. Punch magnet M1 is also operated, by the operation of relay TC, over an obvious circuit, punching a hole whose position indicates that the line recorded is part of an entry containing more than one line.

Relay RCH operates over a circuit extending from battery through the winding and No. 1 normal contacts of said relay and No. 1 contacts of relay TC to ground, opening the circuit of and releasing relay TC and, in turn, the operated punch magnets. Relay RCH is slow to operate to give time for the punch magnets to operate. Operation and release of relay TC also operates and releases the paper-advance magnet PAM over an obvious circuit, advancing tape T to a position for recording the next line. Relay RCH locks up through its No. 1 front contacts to the checking ground on conductor 81 and relay RC operates through No. 2 front contacts of relay RCH to the same ground, connecting the register relays to the punch magnets. A combination of punch magnets corresponding to the operated register relays is thereby operated to record the number of the calling station S. Punch magnet M2 also operates over a circuit extending from battery through the winding of said magnet, No. 6 contacts of relay BB, No. 5 back contacts of relay BA, and No. 1 contacts of relay RC to ground, punching a hole whose position indicates that the line recorded is the last line of an entry of two lines.

Upon the operation of relay RC, relay RTC operates, as before, releasing the operated register relays and, in turn, the operated punch magnets. Release of the register relays opens the circuits of and releases relays RCH and RC and, in turn, relay RTC. Operation and release of relay RC operates and releases the paper-advance magnet PAM over an obvious circuit, advancing tape T to a position for recording the next line. Operation and release of relay RTC operates and releases the stepping magnet STPR over the circuit previously traced, moving the arms of switch SW to the No. 5 terminals of said switch. The circuit of relay PST is thereby opened (relays SR and SS being both operated) and said relay released, releasing, in turn, relays PL0, SL0, L1 and L2. The recorder is now normal and may be used for recording data in connection with other calls.

When the calling party hangs up, relay SR is released. This has no effect upon the circuits shown until relay SS is released either by the called party hanging up or by a timing circuit, in the usual manner. Then relay PST operates over a circuit extending from battery through the winding of said relay, the arm and No. 5 terminal of bank No. 2 of switch SW, No. 2 contacts of relay CH, contacts of relay SS, and back contacts of relay SR to ground, operating relays PL0 and SL0 to connect the recorder to the trunk. Relay MTR is still operated over an obvious circuit and the condition of the circuits is the same as for the previous entry described above. A repetition of the operations already described for that entry, therefore, takes place, making an entry which is similar to the preceding entry in connection with the present call but the time recorded is, of course, the current and later time. When relay RTC operates and releases in connection with this entry, the consequent operation and release of the stepping magnet STPR moves the arms of switch SW to the No. 6 terminals of said switch. The circuit of relay PST is thereby opened and said relay released, releasing, in turn relays PL0, SL0, L1 and L2, disconnecting the recorder from the trunk. The recorder is now normal and may be used for recording data in connection with other calls. The circuit of relay MTR is also opened and said relay released. The release magnet REL operates over an obvious circuit, returning the arms of switch SW to the No. 1 terminals of said switch, which releases the release magnet. The sender has, of course, long since been disconnected so relay PST does not reoperate until the trunk circuit, which is now normal, is used for another call.

While we have illustrated our invention with respect to its application to a particular type of telephone system, it is not limited to such application nor to the specific arrangements disclosed herein. It will be evident to one skilled in the art that many applications, arrangements and modifications other than those herein disclosed are within the scope of the invention.

Moreover, the terms and expressions which we have used in reference to the invention and its elements are used as terms of description and not of limitation, and we have no intention by the use of said terms and expressions of excluding thereby equivalents of the features shown and described or portions thereof but, on the contrary, intend to include therein any and all equivalents and modifications which may be employed without departing from the spirit of the invention.

What is claimed is:

1. In a telephone system, calling stations each having an identifying designation, an inductive means for each of said stations for producing time-spaced impulses characteristic of the designation of said station, a common inductive means for producing uniformly time-spaced impulses coincident with the impulses produced by the inductive means for each of said stations, means responsive to all of said inductive means, and means responsive to said last-mentioned means for registering the designations of said calling stations.

2. In a telephone system, called stations each having an identifying deisgnation, a plurality of means for registering the designations of said called stations, an inductive means for each of said registering means responsive thereto to produce time-spaced impulses characteristic of the designation registered therein, a common inductive means for producing uniformly time-spaced impulses some of which are coincident with the impulses produced by said last-mentioned inductive means, means responsive to all of said inductive means, and means responsive to said last-mentioned means for registering the designations of said called stations.

3. In a telephone system, calling and called stations each having an identifying designation, a plurality of means for registering the designations of said called stations, an inductive means for each of said registering means responsive thereto to produce time-spaced impulses characteristic of the designation therein registered, an inductive means for each of said calling stations for producing time-spaced impulses characteristic of the designation of said calling station, a common inductive means, means responsive to all of said inductive means, and means responsive to said last-mentioned means for registering the designations of said called and calling stations.

4. In a telephone system, calling and called stations each having an identifying designation, an inductive means for each of said calling stations for producing time-spaced impulses characteristic of the designation of said calling station, a plurality of means for registering the designations of said called stations, an inductive means for each of said registering means responsive thereto to produce time-spaced impulses characteristic of the designation registered therein, a common inductive means for producing uniformly time-spaced impulses, means responsive to all of said inductive means, and means responsive to said last-mentioned means for recording on a common medium the designations of said calling and said called stations.

5. A recording system comprising a plurality of electronic devices, each indicative of an item of information, an inductive distributor adapted to apply a less-than-breakdown potential to each of said devices periodically and in succession, means for increasing said potential to breakdown value at selected ones of said devices thereby to operate said latter devices, means responsive to said operated devices, and means responsive to said last-mentioned means for recording the item of information indicated by said operated devices.

6. A recording system according to claim 5 in which said means for increasing said potential to breakdown value comprises an inductive impulser operating in synchronism with said inductive distributor.

7. A circuit network comprising a plurality of electronic devices, an inductive distributor having stator magnetic elements and a rotor magnetic element, circuit connections between the control electrodes of said devices and the stator magnetic elements of said distributor, said rotor magnetic element inducing a less-than-breakdown potential periodically and in succession in each of said stator magnetic elements which is applied over said circuit connections to the control electrodes of said devices, and means effective coincident with said rotor element passing a stator magnetic element for producing an additional potential applicable to the control electrode of the one of said devices which is connected to said last-mentioned stator magnetic element over said circuit connections, whereby said one of said devices is rendered conducting by the two potentials.

8. A circuit network according to claim 7, in which said means comprises an inductive impulser having as many electromagnetic stator elements as said stator elements on said inductive distributor, and a rotor magnetic element connected to the control electrodes of said devices, said rotor magnetic element of said inductive impulser operating in synchronism with that of said inductive distributor, whereby both rotor elements sweep over corresponding stator elements, and whereby the passage of the rotor element of said inductive impulser over an energized electromagnetic stator element on said inductive impulser induces the additional potential applied to the control electrode of said one of said devices.

9. An indicating device comprising in combination a plurality of electronic devices, an inductive distributor having a magnetic stator element for each of said devices, and a rotor element, an electric network interconnecting the control electrodes of said devices and said magnetic stator elements, whereby the inductive coupling of said rotor element periodically and in succession with each one of said stator elements induces a less-than-breakdown potential which is applied to the control electrodes of said devices through said electric network, an inductive impulser having a stator electromagnetic element for each of said devices and rotor element connected to the control electrodes of said devices, said last-mentioned rotor element being operated in synchronism with the rotor element of said inductive distributor, and means for energizing one or more of said stator electromagnetic elements, whereby the inductive coupling of the rotor element of said inductive impulser with an energized stator electromagnetic element induces an additional potential that renders conducting the one electronic device which is connected to the stator magnetic element of said distributor coincidentally being inductively coupled with the rotor element thereof.

10. An indicating device comprising in combination an inductive distributor provided with a plurality of stator magnetic elements and a rotor magnetic element, an inductive impulser having an equal number of energizable stator magnetic elements and a rotor magnetic element operated in synchronism with the rotor magnetic element of said distributor, corresponding stator elements in said distributor and said impulser being periodically and successively coupled inductively by their respective rotor magnetic elements, the rotor magnetic element of said distributor producing an impulse of potential for each coupling thereof with a stator magnetic element of said distributor, the rotor magnetic element of said impulser producing an impulse of potential for each coupling thereof with an energized stator magnetic element of said impulser, means connected to the stator magnetic elements of said distributor and to the rotor magnetic element of said impulser responsive to coincident impulses, and means responsive to said last-mentioned means for indicating energized stator magnetic elements of said impulser.

11. In a telephone system, means for recording items of information pertaining to establishable telephone connections, said means comprising in combination an inductive impulser having magnetic stator elements selectively energizable in accordance with one or more of said items of information, an inductive distributor having a magnetic stator element for each of said items of information, a rotor magnetic element for said distributor adapted to inductively couple periodically and in succession each of the magnetic stator elements of said distributor, thereby to induce for each coupling an impulse of potential applied to said devices, electronic devices connected to the stator elements of said distributor, a rotor magnetic element for said inductive impulser connected to said electronic devices and operated in synchronism with the rotor magnetic element of said distributor to inductively couple each energized magnetic stator element of said impulser, thereby to induce for each coupling an impulse of potential applied to said devices, whereby a device connected to the stator magnetic element of said distributor inductively coupled coincidentally with the inductive coupling of an energized stator magnetic element of said impulser is operated by coincident impulses, means responsive to said operated devices, and means responsive to said last-mentioned means for recording the item or items of information indicated by the energized stator magnetic elements on said impulser.

12. A circuit network comprising a plurality of electronic devices, an inductive distributor adapted to apply a less-than-breakdown potential to each of said devices periodically in succession, and an inductive impulser operating in synchronism with said inductive distributor for increasing said potential to breakdown value at selected ones of said devices, thereby to operate said latter devices.

RALPH E. HERSEY.
EDWARD VROOM.

REFERENCES CITED

The following references are of record in the file of this patent:

UNITED STATES PATENTS

| Number | Name | Date |
|---|---|---|
| 2,172,354 | Blumlein | Sept. 12, 1939 |
| 2,242,640 | Bellows | May 20, 1941 |
| 2,252,766 | Holden | Aug. 19, 1941 |
| 2,265,844 | Korn | Dec. 9, 1941 |
| 2,267,950 | Rhodes | Dec. 30, 1941 |
| 2,270,246 | Bascom et al. | Jan. 20, 1942 |
| 2,275,974 | Mathes | Mar. 10, 1942 |
| 2,291,752 | Parker | Aug. 4, 1942 |
| 2,297,365 | Ostline | Sept. 29, 1942 |
| 2,342,279 | Hersey | Feb. 27, 1944 |
| 2,352,492 | Ostline | June 27, 1944 |
| 2,424,585 | Simon et al. | July 27, 1947 |
| 2,513,112 | Shepherd | June 27, 1950 |
| 2,531,637 | Miller | Nov. 28, 1950 |